United States Patent [19]

Konopka

[11] Patent Number: 4,920,302

[45] Date of Patent: Apr. 24, 1990

[54] FLUORESCENT LAMP POWER SUPPLY

[75] Inventor: John G. Konopka, Ingleside, Ill.

[73] Assignee: Zenith Electronics Corporation, Glenview, Ill.

[21] Appl. No.: 177,798

[22] Filed: Apr. 11, 1988

Related U.S. Application Data

[63] Continuation of Ser. No. 7,231, Jan. 27, 1987, abandoned.

[51] Int. Cl.⁵ .......................................... H05B 37/02
[52] U.S. Cl. ................................... 315/307; 315/308; 315/209 R; 315/291; 315/DIG. 2; 315/DIG. 7
[58] Field of Search .................. 315/307, 308, 209 R, 315/226, 291, 244, DIG. 2, DIG. 7

[56] References Cited

U.S. PATENT DOCUMENTS

| | | | |
|---|---|---|---|
| 4,230,970 | 10/1980 | Potter et al. | 315/307 |
| 4,326,161 | 4/1982 | Kreinberg | 315/307 |
| 4,390,812 | 6/1983 | Seidler | 315/307 |
| 4,499,525 | 2/1985 | Mallory | 315/307 |
| 4,511,195 | 4/1985 | Barter | 315/307 |
| 4,623,824 | 11/1986 | Scolari et al. | 315/241 P |

Primary Examiner—Leo H. Boudreau
Assistant Examiner—Michael Razavi

[57] ABSTRACT

A fluorescent lamp supply includes a self-resonant converter for developing high voltage AC for application to the fluorescent lamp. The on-time of the converter is controlled by a pulse width modulator circuit comprising dual comparators, with one comparator being operated as a low frequency oscillator and the other comparator being used to disable the converter by operating a gate transistor. A reference potential is applied to a potentiometer for controlling the output comparator conduction threshold and for varying the width of the pulses of the pulse width modulator. Variation of the reference potential changes the brightness of the fluorescent lamp. The pulse width modulator duty cycle is inversely proportional to changes in the DC source voltage for maintaining constant lamp brightness with changes in the DC source voltage.

8 Claims, 2 Drawing Sheets

FLUORESCENT LAMP POWER SUPPLY

This application is a continuation of application Ser. No. 007,231, filed Jan. 27, 1987, now abandoned.

BACKGROUND OF THE INVENTION AND PRIOR ART

This invention relates generally to fluorescent lamp power supplies and particularly to battery driven power supplies for fluorescent lamps.

Fluorescent lamps are well-known for their efficiency in converting electrical energy into light energy. Recently, small fluorescent lamps have been used in portable equipment that is battery operated. A fluorescent lamp power supply generally includes a form of DC to AC converter and a step-up transformer for developing a relatively high voltage alternating current from the battery, since the fluorescent lamp requires a significant voltage for operation. Such power supplies are well-known in the art.

The fluorescent lamp has also found acceptance as a "back light" for liquid crystal displays (LCDs), especially LCDs used in connection with small "lap-type" computers. In such use it is desirable to be able to control the brightness of the fluorescent lamp to adapt the LCD display for use under a wide range of environmental lighting conditions. Brightness controls for fluorescent lights have not been available except for large industrial fluorescent lights. In that environment, the brightness controls involve very complex circuit arrangements. Another problem exists with portable fluorescent lamps, namely, that the light output from the fluorescent lamp will diminish with a reduction in the battery supply output voltage. Thus, as the batteries inevitably become weaker with use, the light output of the fluorescent lamp diminishes. Accordingly, there is a need in the art for a fluorescent lamp power supply that solves the above-noted deficiencies.

According to one aspect of the invention, a fluorescent lamp power supply is provided that is capable of controlling the brightness of a fluorescent lamp over a wide range. According to another aspect of the invention, a fluorescent lamp power supply is provided that compensates for changes in the power supply or line voltage to maintain the light output of the fluorescent lamp substantially constant. In apparatus for carrying out both aspects of the invention, a novel pulse width modulator (PWM) circuit is utilized that is readily fabricated from a dual comparator integrated circuit chip.

OBJECT OF THE INVENTION

A principal object of the invention is to provide a novel fluorescent lamp power supply.

Another object of the invention is to provide a fluorescent lamp power supply that maintains substantially constant energy to a fluorescent lamp over a wide range of input voltage variations.

A further object of the invention is to provide a power supply that is capable of controlling the light output of a fluorescent lamp.

Still another object of the invention is to provide a novel pulse width modulator circuit.

A still further object of the invention is to provide a brightness-controllable, light-output-stabilized power supply for a fluorescent lamp.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
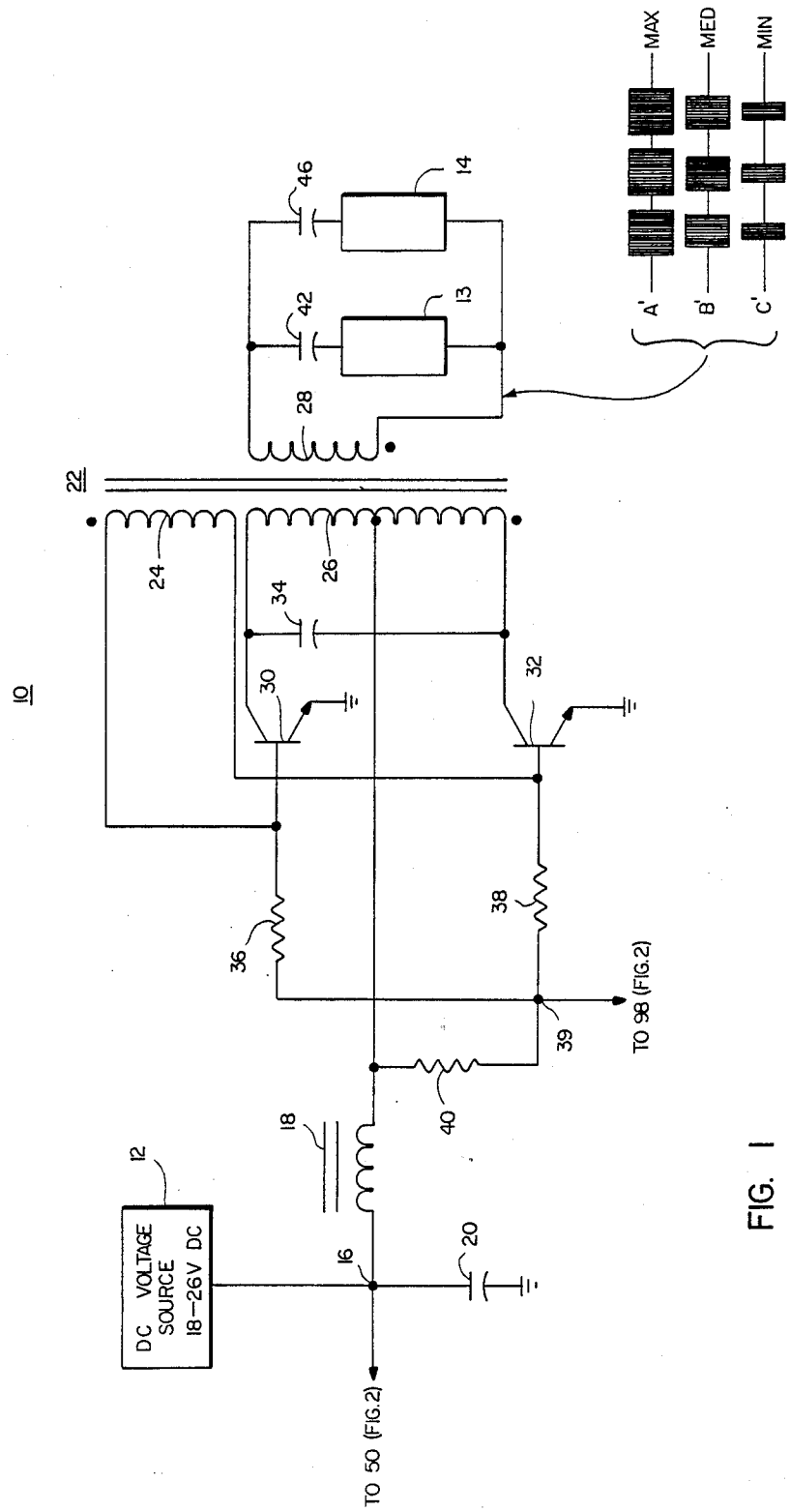
FIGS. 1 and 2 together comprise a simplified schematic diagram of the invention.
Figure 2:
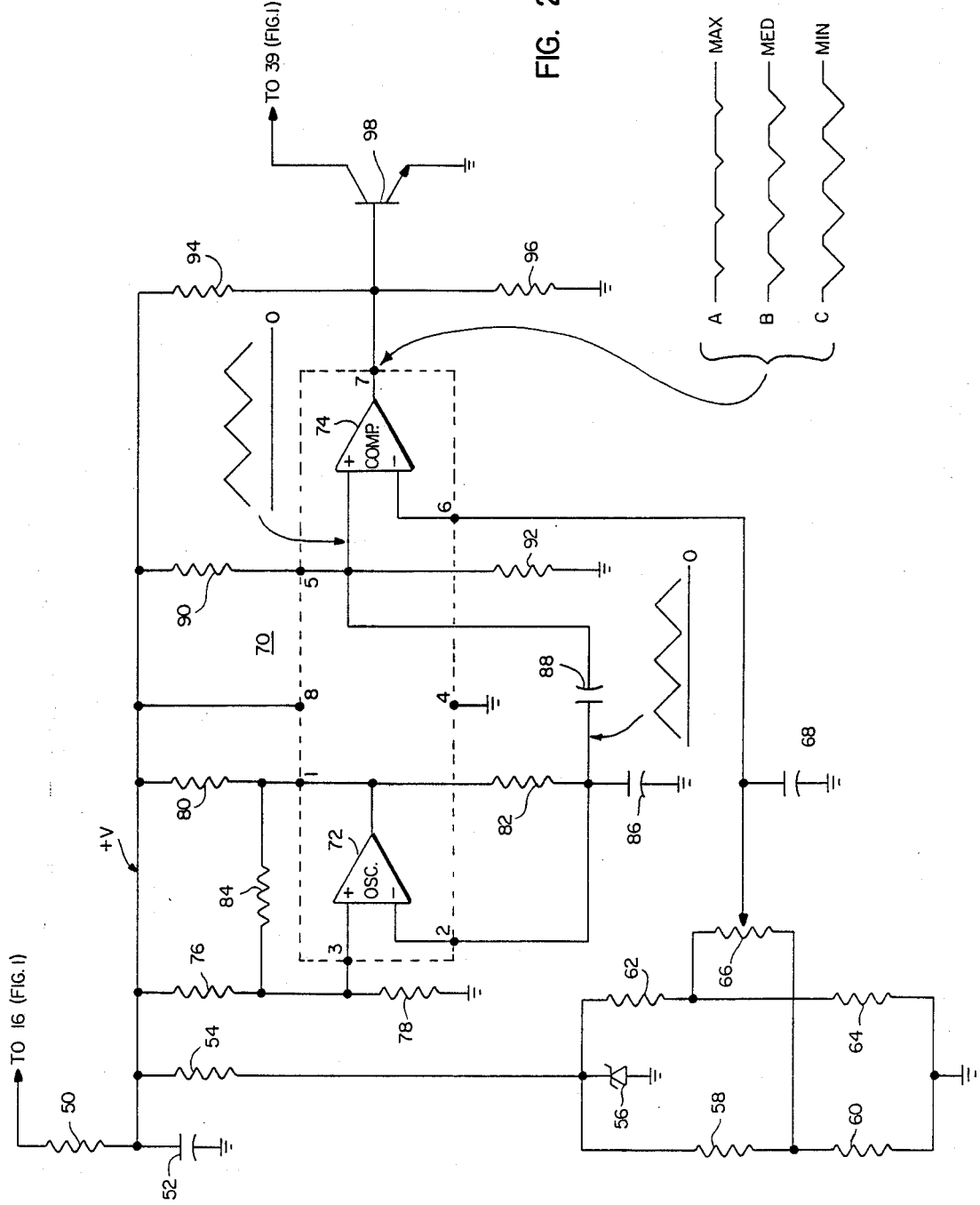

Referring to the drawings, FIG. 1 generally shows a power supply for converting a DC voltage from a battery source or the like to the high frequency AC voltage necessary to drive a fluorescent lamp. FIG. 2, generally shows a novel pulse width modulator circuit, and a control arrangement therefor, for providing the desirable attributes of: adjustability of the light output or brightness of the fluorescent lamp; and stability of the light output of the lamp despite changes in input voltage. Referring particularly to FIG. 1, the power supply includes a converter 10 for supplying power from a low voltage DC voltage source 12 for operating a pair of fluorescent lamps 13 and 14. Voltage source 12 supplies a junction 16, defined by the connection of a choke coil 18 and a filter capacitor 20 that is returned to ground. Junction 16 is connected to the circuitry of FIG. 2, as will be described. The other end of choke coil 18 is connected to the center tap of a primary winding 26 of a transformer 22. Transformer 22 also includes a feedback winding 24 that is connected to the bases of a pair of NPN transistors 30 and 32, each having its collector connected across an opposite end of primary winding 26. A capacitor 34 interconnects the collectors of transistors 30 and 32. The bases of the transistors are returned, through a pair of resistors 36 and 38, to a junction 39. Junction 39 is returned to the center tap of primary winding 26 through a resistor 40 and is also connected to the circuitry of FIG. 2. Secondary winding 28 of transformer 22 develops a high voltage which is applied across a pair of high voltage capacitors 42 and 46 that are respectively connected in series with fluorescent lamps 13 and 14.

The circuit is standard with the exception of the base drive connections of the transistors 30 and 32. When the power supply is turned on, a small amount of base drive current flows through choke 18 to the transistors. One of the transistors draws more current than the other and in so doing, develops a potential across its half of primary winding 26 that produces a base drive potential across feedback winding 24 in a direction to further its turn-on and to turn off the other transistor. Thus, one of the transistors is rapidly turned on while the other is cut off. The peak transistor current is limited by choke 18, which causes a reversal of voltage across primary winding 26 and across feedback winding 24, that causes the transistors to switch their conductive states. The cycle repeats and the frequency of oscillation is determined by the capacitance of capacitor 34 and the inductance of winding 26. Choke 18 assures that a sinewave of current flows through primary winding 26, which is essential to prolong the operating lives of the fluorescent lamps 13 and 14. The voltage waveforms adjacent to secondary winding 28 of transformer 22 illustrate the different brightness levels, from minimum to maximum, for the fluorescent lamps. These voltage waveforms will be described in connection with FIG. 2.

It will be appreciated that, in the power supply circuit of FIG. 1, the voltage amplitude applied by transformer winding 28 across the fluorescent lamps 13 and 14 is dependent upon the amplitude of the voltage of DC voltage source 12. As indicated, the voltage of DC voltage source 12 can typically vary from 18 to 26 volts which would be reflected in a substantial change in brightness of lamps 13 and 14. As will be seen, with the circuit of the invention, the voltage change indicated, i.e., 18 to 26 volts DC, is fully compensated and results in substantially constant light output from fluorescent lamps 13 and 14.

In FIG. 2, a resistor 50 and a filter capacitor 52 are connected in series from junction 16 (FIG. 1) to ground and develop the "voltage rail" for the circuit at +V volts. A resistor 54 is connected from the voltage rail to ground through a zener diode 56. Zener diode 56 supplies a pair of voltage dividers, consisting of resistors 58 and 60, and resistors 62 and 64, respectively. A potentiometer 66 is connected across the junctions of the resistors in the voltage dividers. The slider on potentiometer 66 is connected to ground through a filter capacitor 68 and to pin 6 of an integrated circuit indicated by dashed line box 70. The integrated circuit is a common, readily available, dual comparator and is identified by part No. LM393. The numbers indicated within the dashed line box are the pin numbers of the integrated circuit. Two individual comparators 72 and 74 are included therein. Comparator 72 is labelled "OSC" and comparator 74 is labelled "COMP" in accordance with their functions in the inventive circuit.

A voltage divider, consisting of a resistor 76 and a resistor 78, has its junction connected to pin 3 which corresponds to the non-inverting terminal of oscillator 72. A resistor 80 is connected from the +V voltage rail to the output of oscillator 72 (pin 1) and to a resistor 82 which is connected to ground through a capacitor 86. The junction of resistor 82 and capacitor 86 is connected to the inverting terminal (pin 2) of oscillator 72. A resistor 84 connects the output of oscillator 72 back to its non-inverting terminal. A coupling capacitor 88 couples the signal at capacitor 86 to the noninverting terminal (pin 5) of comparator 74. This terminal is also supplied from the +V rail through a resistor 90 and is connected to ground through a resistor 92. As mentioned, the inverting terminal (pin 6) of comparator 74 is connected to the slider of potentiometer 66. A voltage divider, consisting of a resistor 94 and a resistor 96, is connected from the +V rail to ground and its junction is connected to the output terminal (pin 7) of comparator 74 and to the base of an NPN switch transistor 98 having its emitter connected to ground and its collector connected to junction 39 of FIG. 1.

In operation, capacitor 86 charges through resistors 80 and 82. The voltage at the junction of these resistors, which is the output of oscillator 72 (pin 1), is monitored by a resistor 84 that is connected to the non-inverting terminal (pin 3) of the oscillator. When the voltage rises sufficiently, comparator (oscillator) 72 switches and capacitor 86 is discharged through resistor 82 and the output terminal (pin 1) of oscillator 72. (It will be appreciated that the internal connections of the integrated circuit are not shown.) The result is that capacitor 86 is charged and discharged at about a 250 Hz rate and develops a substantially triangular-shaped waveform thereacross which is applied through capacitor 88 to the noninverting terminal (pin 5) of comparator 74. Pin 5 is maintained at a higher DC level by virtue of its connection to the voltage divider consisting of resistors 90 and 92. The change in DC voltage is clearly shown in the waveforms adjacent capacitor 86 and comparator 74. The inverting terminal (pin 6) of comparator 74 is supplied with a DC potential that is variable between first and second fixed DC voltages each of which is maintained constant because of the regulating action of zener diode 56. Therefore, the voltage at the inverting terminal of comparator 74 remains constant at the level determined by the position of the slider on potentiometer 66, despite changes in the voltage of the voltage source 12. This is not true of the voltage at the non-inverting terminal of comparator 74, which fluctuates with changes in the voltage of voltage source 12 since it is connected directly thereacross via resistors 90 and 92. This arrangement provides the constant-brightness-with-changes-in-input-voltage aspect of the invention.

The conduction threshold of comparator 74 is established by, and may be changed by, the setting of potentiometer 66. As indicated by the waveforms A, B and C adjacent the output of comparator 74, the V-shaped portions (troughs) represent conduction of the comparator, which will be seen to be inversely related to brightness of the fluorescent lamps. Waveform C therefore represents a minimum "MIN" lamp brightness level, waveform B represents a medium "MED" lamp brightness level and waveform A represents a maximum "MAX" brightness level.

As mentioned, the frequency of the waveforms is approximately 250 Hz. Switch transistor 98 is normally nonconductive because comparator 74 keeps its base in cutoff. As the reference potential from potentiometer 66 is changed however, comparator 74 will switch (conduct) when the troughs of the triangular waveform reach the threshold for the non-inverting terminal and result in transistor 98 also being turned on. The period of conduction of transistor 98 is dependent upon the time that the non-inverting terminal of comparator 74 is at its conduction threshold. Conduction of switch transistor 98 results in shutting down the oscillator in the parallel resonance self-oscillating converter (FIG. 1) and consequent reduction in the rms energy supplied to the fluorescent lamps. Thus, a brightness control for the fluorescent lamps is provided.

Reverting to FIG. 1, the connection of the collector of switch transistor 98 to junction 39 results in resistor 40 being connected to ground whenever switch transistor 98 is driven conductive. When junction 39 is connected to ground, the base drive for transistors 30 and 32 terminates and the oscillator stops. It will be recalled that the oscillator runs at about 30 KHz whereas the pulse width modulator circit operates at about 250 Hz. Consequently, the oscillator is interrupted at a 250 Hz rate for periods of time that are dependent upon the duty cycle of the pulse width modulator. Consequently, the duration or duty cycle of the 30 KHz oscillator voltage applied to the fluorescent lamps is inversely proportional to the conduction time of switch transistor 98 which results in bursts of 30 KHz energy of differing duration being supplied to the lamps. The rms value of that energy determines the light output or brightness of the fluorescent lamps. The brightness control is accomplished at a very low parts cost, on the order of fifty cents. In view of the many battery operated fluorescent lights on the market, the brightness control of the invention appears to be very attractive. This is especially so since with the control, only the amount of light required in any particular situation need by supplied with a marked increase in battery life.

It has thus been shown that the novel pulse width modulator, consisting of a pair of comparators, can be utilized to control the operation of a high frequency oscillator and thereby control the brightness of a fluorescent lamp. Since the pulse width modulator is arranged to compare a fixed reference voltage to a voltage that is, in part, dependent upon fluctuations in the input voltage, i.e., from a battery, changes in the input voltage, which would otherwise result in changes in the brightness of the fluorescent lamps, can be compensated for. For example, should the output of DC voltage source 12 rise to its maximum of 26 volts, the output of secondary winding 28 will rise from a normal 1500 volts to about 2000 volts. This would result in a significant increase in brightness of fluorescent lamps 13 and 14. However, with the circuit of the invention, the increase in voltage of DC voltage source 12 is communicated to the non-inverting input of comparator 74, whereas the voltage applied to its inverting input is held constant because of its connection to the stabilized voltage developed by zener diode 56. As the voltage at the non-inverting terminal 74 rises, the conduction threshold is reached more rapidly and gate transistor 98 is driven conductive for increasing lengths of time, thus increasing the duty cycle of the pulse width modulated output at junction 39. This results in the oscillator in the self-resonating converter 10 being disabled for longer periods of time which decreases the lengths of the bursts of high frequency energy supplied by transformer winding 28 to the fluorescent lamps. The decreased duration bursts result in the rms energy to the lamps being held substantially the same even though the actual voltage applied thereto has increased. Thus, the lamp brightness is stabilized for changes in the DC input voltage This feature, as mentioned above, is of great importance in battery-operated equipment.

It will be appreciated that the pulse width modulator of the invention may be made to vary from 0% duty cycle to 100% duty cycle. In the circuit of the invention, limits are imposed by resistors 60 and 64 since the fluorescent lamps require a minimum level of energy to operate at all and a maximum level is provided to enable a range of regulation for maintaining constant brightness with changes in the DC voltage input.

It is recognized that numerous changes in the described embodiments of the invention will be apparent to those skilled in the art without departing from its true spirit and scope. The invention is to be limited only as defined in the claims.

What is claimed is:

1. A power supply for a fluorescent lamp comprising:
    generating means for developing a high frequency voltage for supplying high frequency energy to a fluorescent lamp;
    switching means, comprising pulse width modulation means, operating at a lower frequency than said high frequency, for periodically interrupting the supply of said high frequency energy to provide bursts of said high frequency energy at said lower frequency rate; and
    control means for controlling said switching means to control the brightness of said fluorescent lamp by controlling the duration of said bursts of said high frequency energy.

2. The supply of claim 1 wherein said control means comprises a controllable DC voltage coupled to said pulse width modulation means for changing the duty cycle of said pulse width modulation means.

3. The supply of claim 2 wherein said generating means comprise a parallel resonant self-oscillating converter, said pulse width modulating means disabling said generating means at said lower frequency rate for time periods determined by said duty cycle.

4. A power supply for a fluorescent lamp comprising:
    generating means comprising a parallel resonant selfoscillating converter for developing a high frequency voltage for supplying high frequency energy to a fluorescent lamp;
    switching means, comprising pulse width modulation means, operating at a lower frequency than said high frequency, for periodically interrupting the supply of said high frequency energy to provide bursts of said high frequency energy at said lower frequency rate; and
    control means comprising a controllable DC voltage coupled to said pulse width modulation means for changing the duty cycle of said pulse width modulation means to control the brightness of said fluorescent lamp by controlling the duration of said bursts of said high frequency energy, said pulse width modulating means disabling said generating means at said lower frequency rate for time periods determined by said duty cycle, said pulse width modulation means comprising two comparators and charge/discharge circuit means for operating one of said comparators as an oscillator.

5. The supply of claim 4 wherein said generating means includes a pair of transistors each including a base drive resistor;
    said pulse width modulation means further including a gate transistor coupled to said base drive resistors for disabling base drive to said transistors as a function of the duty cycle of said pulse width modulation means.

6. A power supply for a fluorescent lamp comprising:
    a source of DC voltage subject to change in voltage;
    DC to AC converter means coupled to said source of DC voltage for developing a high frequency voltage for supplying high frequency energy to a fluorescent lamp;
    switching means, comprising a pulse width modulator, operating at a lower frequency than said high frequency, coupled to said converter means for interrupting said converter means at a rate equal to said lower frequency to supply bursts of said high frequency energy to said fluorescent lamp;
    reference potential means coupled to said DC voltage source for developing a reference potential that is substantially independent of variations in the voltage of said DC voltage source; and
    control means coupled to said reference potential means for controlling the duty cycle of said pulse width modulator to compensate for changes in brightness of said fluorescent lamp, due to changes in voltage of said voltage source, by varying the duration of said bursts of high frequency energy.

7. A power supply for a fluorescent lamp comprising:
    a source of DC voltage subject to change in voltage;
    DC to AC converter means coupled to said source of DC voltage for developing a high frequency voltage for supplying high frequency energy to a fluorescent lamp;
    switching means, comprising a pulse width modulator, operating at a lower frequency than said high frequency, coupled to said converter means for interrupting said converter means at a rate equal to said lower frequency to supply bursts of said high frequency energy to said fluorescent lamp;

reference potential means coupled to said DC voltage independent of variations in the voltage of said DC voltage source; and control means coupled to said reference potential means for controlling the duty cycle of said pulse width modulator to compensate for changes in brightness of said fluorescent lamp, due to changes in voltage of said voltage source, by varying the duration of said bursts of said high frequency energy; and said pulse width modulator comprising:

a pair of comparators;

charge/discharge means in circuit with one of said comparators and forming an oscillator;

means supplying the output of said oscillator to the other of said comparators; and said control means being coupled to said other comparator and the output of said other comparator being coupled to said converter means.

8. A self-regulating power supply for a fluorescent lamp comprising:

a parallel resonant self-oscillating converter for developing a high frequency, high voltage output for supplying a fluorescent lamp with high frequency energy from a DC voltage source that is subject to variation in voltage;

low frequency pulse width modulation means coupled to said DC voltage source;

means for developing a reference potential coupled to said DC voltage source;

comparator means in said low frequency pulse width modulation means supplied with said reference potential and with said DC voltage for developing a pulse width modulated output that varies with changes in voltage of said DC voltage source; and means for controlling the conduction duty cycle of said self-oscillating converter with the output of said low frequency pulse width modulation means whereby variable duration bursts of said high frequency energy at said low frequency rate are supplied to said fluorescent lamp.

* * * * *